UNITED STATES PATENT OFFICE.

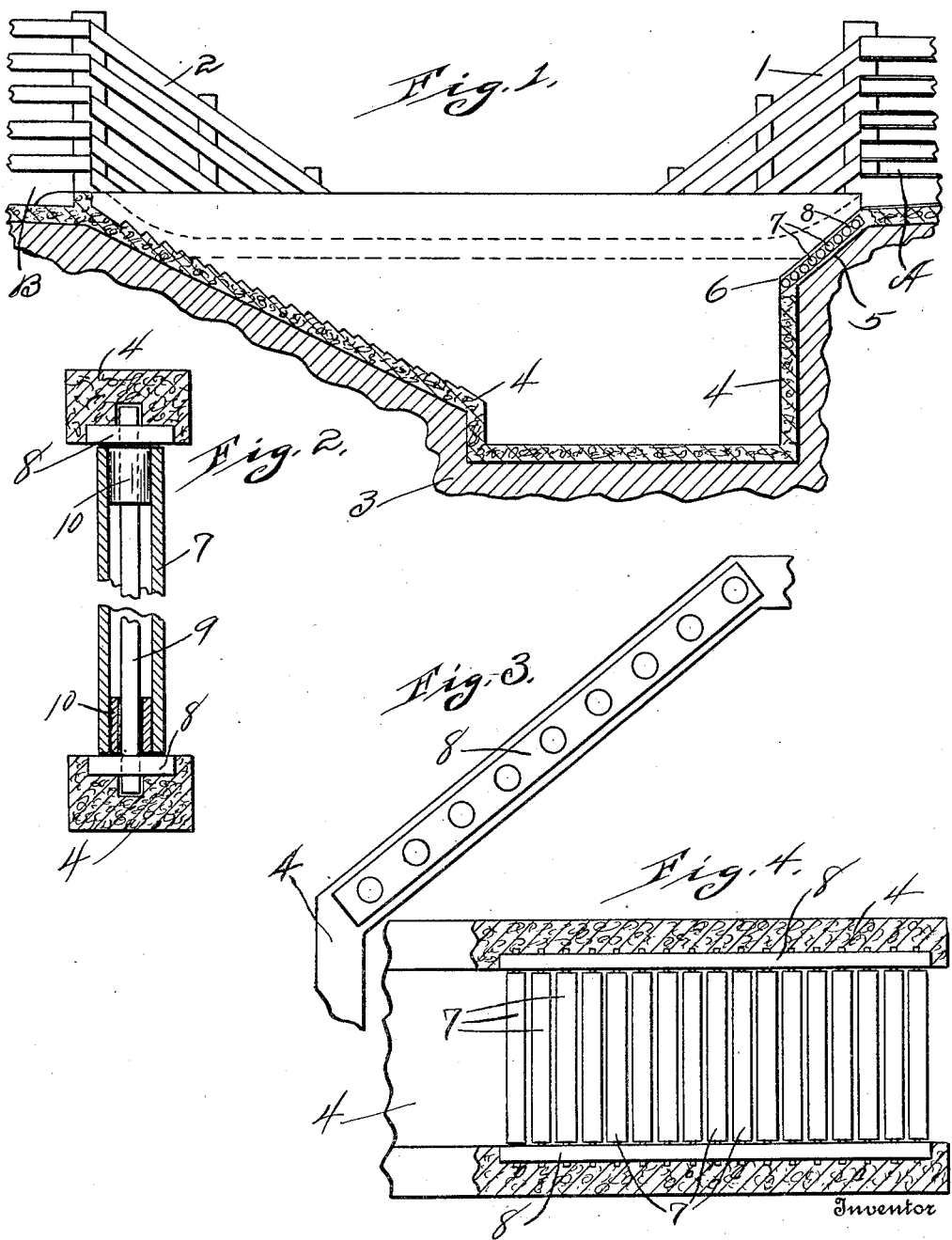

THOMAS L. MULLINS, OF AUBREY, TEXAS.

DIPPING-VAT.

1,345,801.   Specification of Letters Patent.   Patented July 6, 1920.

Application filed October 18, 1919. Serial No. 331,656.

*To all whom it may concern:*

Be it known that I, THOMAS L. MULLINS, a citizen of the United States of America, residing at Aubrey, in the county of Denton and State of Texas, have invented certain new and useful Improvements in Dipping-Vats, of which the following is a specification.

My invention relates to improvements in vats for treating living beings to rid them of ticks or other pests; and the object is to improve the vats in use so that the animals will not be injured during the process of dipping them in the vats. Very frequently portions of the skin are knocked or scraped off the hocks or hind legs and this causes trouble because such places become infected with worms. The object is to provide means for preventing injury to the animals which are dipped to destroy insects with which the animals are infested. Other objects and advantages will be fully explained in the following description and the invention will be more particularly pointed out in the claims.

Reference is had to the accompanying drawings which form a part of this application.

Figure 1 is a broken section of a vat, showing sufficient parts thereof to illustrate the improvements. Fig. 2 is a longitudinal section of one of the rollers, showing sections of the bearings which support the rollers. Fig. 3 is a side elevation of one of the side frame supports for the inclined portion of the chute for delivering cattle to the vat. Fig. 4 is a broken portion of the same, partly in section.

Similar characters of reference are used to indicate the same parts throughout the several views.

A portion of a dipping vat is shown. The entrance or inlet chute is indicated at A and the exit chute is indicated at B. The chute generally is of the usual type, having guard walls 1 and 2 of slats or boards. The vat is constructed preferably in the ground 3 where this can be done and lined with concrete 4 and is made approximately six feet deep so that the liquid therein will be six feet deep. The approach A may be made level on the bottom, but a portion 5 is inclined to the shoulder 6. The shoulder 6 is the part which has been injuring the cattle and the object of this invention is to protect the cattle from the rather sharp edge which the construction makes. Efforts to remedy this making the part 6 curved were not satisfactory and did not prevent the trouble. I have provided rollers 7 which will push the cattle off into the liquid without hurting them. Bearing bars 8 are countersunk in the concrete wall 4. The antifriction rollers 7 are journaled in the bearing bars 8. In order to provide suitable journals for the rollers 7 rods 9 are used and the rollers 7 are mounted on the rods 9 and the ends of the rods constitute the journals. In order to avoid friction of the rollers against the rods 9, short pieces of pipe 10 are driven into the ends of the pipes 7 which constitute the antifriction rollers and the short pipes 10 are rigid with the pipes 7. The short pipes 10 turn on the rods 9 when the rollers 7 turn. Various changes in the sizes, proportions, and construction of the several parts may be made without departing from my invention. The rods 9 might be pipes and answer the same purpose.

What I claim, is,—

1. In a dipping vat provided with an inclined inlet chute, bearing bars mounted on each side of said incline, antifriction rollers, and journals for said rollers journaled in said bearing bars.

2. In a dipping vat provided with an inclined inlet chute and concrete side walls therefor, bearing bars countersunk in said concrete walls, and antifriction rollers journaled in said bearing bars.

3. In a dipping vat provided with an inclined inlet chute and concrete side walls therefor, bearing bars countersunk in said concrete walls, and roller bearings consisting of rods journaled in said bearing bars and pipes mounted loosely on said rods.

4. In a dipping vat provided with an inclined inlet chute and concrete side walls therefor, bearing bars countersunk in said concrete walls, rods journaled in said bars, and roller bearings consisting of pipes mounted on said rods and provided with means for spacing the pipes from said rods.

In testimony whereof, I set my hand, this thirteenth day of October, A. D. 1919.

THOMAS L. MULLINS.